United States Patent
Green et al.

(10) Patent No.: US 10,356,224 B2
(45) Date of Patent: Jul. 16, 2019

(54) PLUG-ON NETWORKED AUDIO ADAPTER

(71) Applicant: Audio-Technica U.S., Inc., Stow, OH (US)

(72) Inventors: Jacquelynn A. Green, Streetsboro, OH (US); Benjamin M. Cochran, Akron, OH (US)

(73) Assignee: AUDIO-TECHNICA U.S., INC., Stow, OH (US)

( * ) Notice: Subject to any disclaimer, the term of this patent is extended or adjusted under 35 U.S.C. 154(b) by 0 days.

(21) Appl. No.: 16/046,064

(22) Filed: Jul. 26, 2018

(65) Prior Publication Data

US 2018/0332146 A1     Nov. 15, 2018

Related U.S. Application Data (63) Continuation of application No. 15/372,194, filed on Dec. 7, 2016, now Pat. No. 10,063,667.

(60) Provisional application No. 62/265,057, filed on Dec. 9, 2015.

(51) Int. Cl.
  *H04L 29/06* (2006.01)
(52) U.S. Cl.
  CPC ............ *H04L 69/08* (2013.01); *H04L 65/601* (2013.01)
(58) Field of Classification Search
  CPC ............................ H04L 69/08; H04L 65/601
  See application file for complete search history.

(56) References Cited

U.S. PATENT DOCUMENTS

| | | | |
|---|---|---|---|
| 5,684,261 A | 11/1997 | Luo | |
| 2002/0124097 A1* | 9/2002 | Isely | H04H 60/95 709/231 |
| 2003/0107482 A1* | 6/2003 | Kim | H04L 41/22 340/500 |
| 2008/0232243 A1 | 9/2008 | Oren et al. | |
| 2011/0002429 A1 | 1/2011 | Williams et al. | |
| 2012/0005713 A1* | 1/2012 | Morris | H04N 21/4263 725/118 |
| 2014/0036672 A1 | 2/2014 | Kulkarni et al. | |
| 2014/0365372 A1* | 12/2014 | Ross | H04L 63/0471 705/44 |
| 2016/0269134 A1* | 9/2016 | Malone | H04H 60/04 |

OTHER PUBLICATIONS

U.S. Notice of Allowance for U.S. Appl. No. 15/372,194 dated Jul. 26, 2018.

* cited by examiner

*Primary Examiner* — Duc C Ho
(74) *Attorney, Agent, or Firm* — Sherman IP LLP; Kenneth L. Sherman; Hemavathy Perumal (57) ABSTRACT

One embodiment provides an apparatus comprising an input connector directly mateable with a media device to receive an analog signal. The apparatus further comprises an amplifier configured to amplify the analog signal, an analog-to-digital converter configured to convert the analog signal to a digital signal, a network interface configured to convert the digital signal to a networked compliant digital signal compatible with at least one network protocol, and an output connector mateable with a standard network cable that transmits the networked compliant digital signal.

18 Claims, 7 Drawing Sheets

PLUG-ON NETWORKED AUDIO ADAPTER

CROSS REFERENCE TO RELATED APPLICATIONS

This application is a continuation of and claims priority from U.S. patent application Ser. No. 15/372,194, filed on Dec. 7, 2016. U.S. patent application Ser. No. 15/372,194 claims priority from U.S. Provisional Patent Application Ser. No. 62/265,057, filed on Dec. 9, 2015. Both U.S. patent application Ser. No. 15/372,194 and U.S. Provisional Patent Application Ser. No. 62/265,057 are incorporated herein by reference.

TECHNICAL FIELD

One or more embodiments relate generally to digital media networking, and in particular, a plug-on networked media adapter directly mateable with a professional media product to output networked media compatible with a network protocol.

BACKGROUND

Electronic devices capable of receiving input may utilize network protocols, such as Digital Audio Network Through Ethernet (Dante), Audio Video Bridging (AVB), Ravenna, or other network protocols that are not yet standardized. Different types of network protocols exist, but operation of equipment may not be interchangeable.

SUMMARY

One embodiment provides an apparatus comprising an input connector directly mateable with a media device to receive an analog signal. The apparatus further comprises an amplifier configured to amplify the analog signal, an analog-to-digital converter configured to convert the analog signal to a digital signal, a network interface configured to convert the digital signal to a networked compliant digital signal compatible with at least one network protocol, and an output connector mateable with a standard network cable that transmits the networked compliant digital signal.

Another embodiment provides a method comprising, at a networked media adapter, receiving an analog signal from a media device that is directly mated with an input connector of the adapter, amplifying the analog signal, converting the analog signal to a digital signal, converting the digital signal to a networked compliant digital signal compatible with at least one network protocol, and outputting the networked compliant digital signal via an output connector of the adapter. The output connector is mateable with a standard network cable that transmits the networked compliant digital signal.

Another embodiment provides a network comprising a plurality of media devices, a plurality of plug-on networked media adapters, and a plurality of media equipment. Each plug-on networked media adapter is directly mated with one media device of the network to convert an analog signal from the media device to a networked compliant digital signal compatible with at least one network protocol. Each media equipment receives one or more networked compliant digital signals outputted by one or more plug-on networked media adapters of the network over one or more standard network cables.

These and other features, aspects and advantages of the present invention will become understood with reference to the following description, appended claims and accompanying figures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention together with advantages and features, by way of example with reference to the drawings.

DETAILED DESCRIPTION

One or more embodiments relate generally to digital media networking, and in particular, a plug-on networked media adapter directly mateable with a professional media product to output networked media compatible with a network protocol. One embodiment provides an apparatus comprising an input connector directly mateable with a media device to receive an analog signal. The apparatus further comprises an amplifier configured to amplify the analog signal, an analog-to-digital converter configured to convert the analog signal to a digital signal, a network interface configured to convert the digital signal to a networked compliant digital signal compatible with at least one network protocol, and an output connector mateable with a standard network cable that transmits the networked compliant digital signal.

Another embodiment provides a method comprising, at a networked media adapter, receiving an analog signal from a media device that is directly mated with an input connector of the adapter, amplifying the analog signal, converting the analog signal to a digital signal, converting the digital signal to a networked compliant digital signal compatible with at least one network protocol, and outputting the networked compliant digital signal via an output connector of the adapter. The output connector is mateable with a standard network cable that transmits the networked compliant digital signal.

Another embodiment provides a network comprising a plurality of media devices, a plurality of plug-on networked media adapters, and a plurality of media equipment. Each plug-on networked media adapter is directly mated with one media device of the network to convert an analog signal from the media device to a networked compliant digital signal compatible with at least one network protocol. Each media equipment receives one or more networked compliant digital signals outputted by one or more plug-on networked media adapters of the network over one or more standard network cables.

For expository purposes, the term "network protocol" as used herein refers to a communication protocol for transporting data (e.g., media, such as audio and/or video) through a network. There are different types of network protocols. Examples of different types of network protocols include, but are not limited to, Digital Audio Network Through Ethernet (Dante), Audio Video Bridging (AVB), Ravenna, etc. The terms "network protocol", "network standard", "network communication protocol", and "network protocol configuration" may be used interchangeably in this specification.

For expository purposes, the term "networked compliant digital signal" as used herein refers to a digital signal (e.g., a digital media signal, such as a digital audio signal and/or a digital video signal) that is compliant with at least one network protocol.

For expository purposes, the term "professional media product" as used herein refers to a professional broadcast/media device/system, such as a professional audio device/system or a professional video device/system, etc. Examples of professional media products include, but are not limited to, microphones, wireless microphones, etc.

For expository purposes, the term "standard network cable" as used herein refers to a type of cable used in a computer network such as Ethernet for transporting networked compliant digital signals through the network. Examples of standard network cables include, but are not limited to, Category 5 (CAT5) cables, etc.

Conventionally, in digital audio networking, networked audio is supplied utilizing one or more analog microphone cables ("analog mic cables") connected to one or more breakout networked audio converter boxes ("breakout boxes") in a delivery chain. The analog mic cables may be subject to unwanted electromagnetic interference (EMI) and limit signal performance (i.e., capacitive loss of signals). Some techniques have attempted miniaturization of circuits in professional audio devices, such as microphones, without success due to limitations in size/space and increased power consumption.

One or more embodiments provide a small, separate apparatus that is directly mateable with a professional media product to support digital media conversion and network protocol conversion. In one embodiment, the apparatus is a plug-on networked media adapter. In one embodiment, the apparatus is a plug-on networked audio adapter that is directly mateable with a professional audio device/system (e.g., a microphone) to support digital audio conversion and network audio protocol conversion.

Figure 1:
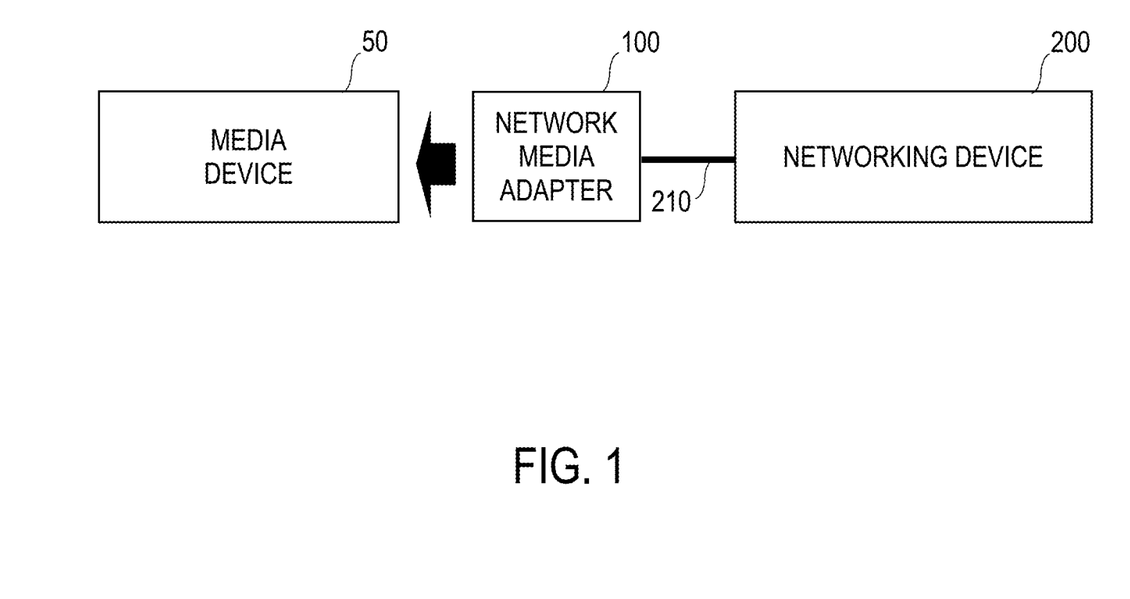
FIG. 1 illustrates an example plug-on networked media adapter, in accordance with one embodiment.

FIG. 1 illustrates an example plug-on networked media adapter 100, in accordance with one embodiment. The adapter 100 comprises a releasably mateable input connector 110 (FIG. 2) that is directly mateable with an output connector 51 (FIG. 2) of a media device 50. The media device 50 comprises at least one professional media product (e.g., a microphone). In one embodiment, the adapter 100 is mateable with any type of existing professional media product.

As described in detail later herein, when the adapter 100 is mated with the media device 50, the adapter 100 is configured to: (1) supply power to the media device 50 to power on the media device 50, (2) receive an analog signal from the media device 50 (e.g., an analog microphone level signal if the media device 50 comprises a microphone), and (3) convert the analog signal to a networked compliant digital signal that is compatible with at least one type of network protocol. In one embodiment, the adapter 100 is configured to support and accommodate any type of network protocol.

Figure 4:
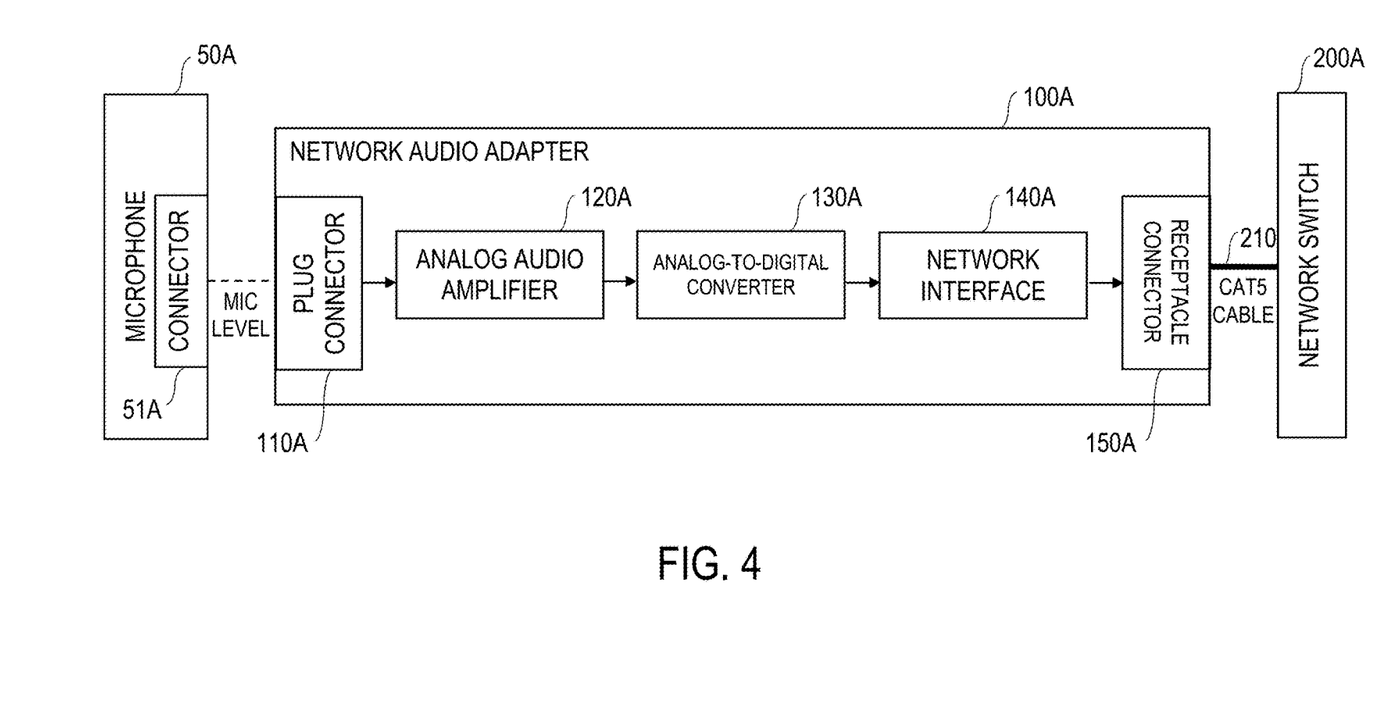
FIG. 4 illustrates an example plug-on networked audio adapter in detail, in accordance with one embodiment.

A networking device 200 may receive the networked compliant digital signal outputted by the adapter 100 via a standard network cable 210 (e.g., a CAT5 cable). Specifically, the adapter 100 further comprises an output connector 150 (FIG. 2) that is mateable with a standard network cable 210 that transmits networked compliant digital signals outputted by the adapter 100 to the networking device 200. The networking device 200 may distribute the networked compliant digital signals to one or more media equipment 220 (FIG. 5) in a delivery chain (e.g., one or more audio mixers in an audio delivery chain). In one embodiment, the networking device 200 comprises a network switch 200A (FIG. 4).

The adapter 100 provides a multi-functional platform that enables flexible, efficient, and optimized networked communication performance.

Figure 2:
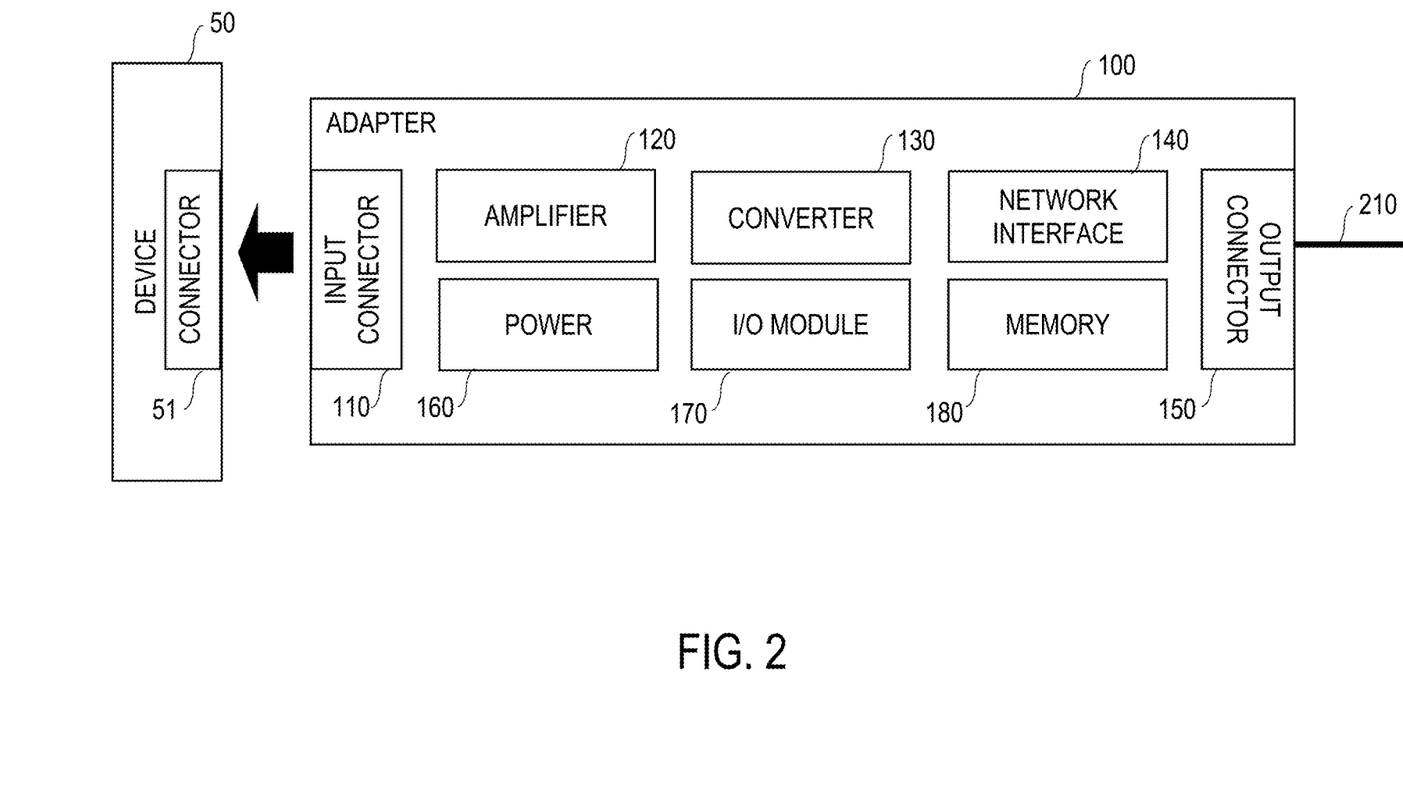
FIG. 2 illustrates an example networked media adapter in detail, in accordance with one embodiment.

FIG. 2 illustrates an example networked media adapter 100 in detail, in accordance with one embodiment. A networked media adapter 100 comprises at least one of the following components: (1) a releasably mateable input connector 110, (2) an amplifier 120, (3) an analog-to-digital (A/D) converter 130, (4) a network interface unit 140, (5) an output connector 150, and (6) a power unit 160.

The input connector 110 is directly mateable with an output connector 51 of a media device 50. In one embodiment, the input connector 110 comprises a plug connector that is directly mateable with a receptacle connector (e.g., a mating socket, etc.). For example, the input connector 110 may be a XLR connector. In another embodiment, the input connector 110 comprises another type of connector (e.g., fasteners like screws, snaps, treads, or any other temporary mechanical or magnetic connections).

The power unit 160 is configured to supply power to a media device 50 that the input connector 110 is mated with.

The amplifier 120 is configured to: (1) receive, via the input connector 110, an analog signal from a media device 50 that the input connector 110 is mated with, and (2) amplify the analog signal received.

The A/D converter 130 is configured to: (1) receive, from the amplifier 120, a resulting amplified analog signal, and (2) convert the amplified analog signal to a digital signal.

The network interface unit 140 is configured to: (1) receive, from the A/D converter 130, a resulting digital signal, and (2) prepare and convert the digital signal into a networked compliant digital signal that is compatible with at least one type of network protocol.

The output connector 150 is directly mateable with a standard network cable 210 that transmits networked compliant digital signals outputted by the adapter 100 to a networking device 200. In one embodiment, the output connector 150 comprises a receptacle connector (e.g., a mating socket, etc.) that is directly mateable with a plug connector. For example, the output connector 150 may be a RJ45 connector. In another embodiment, the output connector 150 comprises another type of connector.

In one embodiment, the adapter 100 further comprises one or more input/output (I/O) modules 170. Examples of I/O modules 170 include, but are not limited to, a keypad, a button, a switch, a touch screen, a display screen, etc. A user may interact with an I/O module 170 (e.g., user selection of a button, user interaction with a switch, a touch screen, etc.) to provide input to the adapter 100.

In one embodiment, the adapter 100 further comprises a memory unit 180 for maintaining data, such as preferred user settings, default settings, etc.

In one embodiment, the network interface unit 140 is configured to determine a correct/desired type of network protocol that the networked compliant digital signal must be compatible with. In one embodiment, the network interface unit 140 determines a correct/desired type of network protocol based on one of the following: (1) user selection of a particular network protocol configuration, (2) automatic self-discovery, or (3) a build configuration.

In one embodiment, a user may interact with an I/O module 170 to specify/select a particular network protocol configuration from a set of different network protocol configurations.

In one embodiment, the network interface unit 140 is configured to initiate/trigger automatic self-discovery of a correct/desired type of network protocol when the output connector 150 mates with a standard network cable 210.

In one embodiment, the build configuration may be adjusted by replacing or exchanging some circuitry within the adapter 100, thereby facilitating different types of network protocols.

In one embodiment, the network interface unit 140 is configured to arbitrate and provide one or more adjusted operational conditions compatible/appropriate for a correct/desired type of network protocol. For example, the adjusted operational conditions may include, but are not limited to, at least one of the following: a clock synchronization signal, signal/circuit conditioning, noise conditioning, impedance conditioning, etc. The network interface unit 140 generates a networked compliant digital signal based on one or more adjusted operational conditions compatible/appropriate for the correct/desired type of network protocol.

Figure 3:
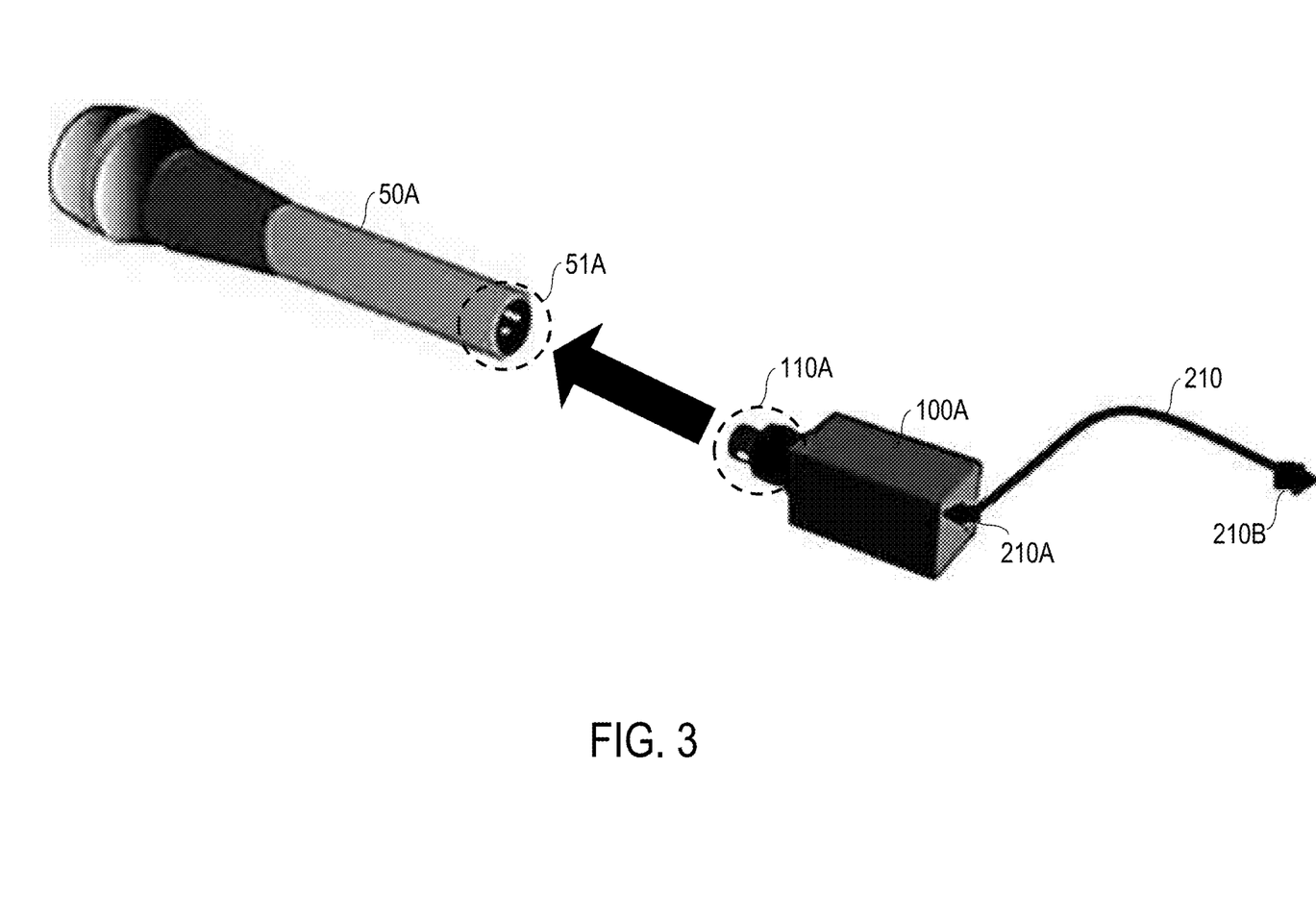
FIG. 3 illustrates an example plug-on networked audio adapter, in accordance with one embodiment.

FIG. 3 illustrates an example plug-on networked audio adapter 100A, in accordance with one embodiment. In one embodiment, a networked media adapter 100 is implemented as a plug-on networked audio adapter 100A. The audio adapter 100A is directly mateable with a professional audio device/system, such as a microphone 50A. For example, as shown in FIG. 3, the audio adapter 100A comprises a releasably mateable plug connector 110A that is directly mateable with a receptacle connector 51A of the microphone 50A.

When the audio adapter 100A is mated with the microphone 50A, the audio adapter 100A supplies power to the microphone 50A to power on the microphone 50A. When the microphone 50A is in operation, the audio adapter 100A receives an analog microphone level signal ("mic level signal") from the microphone 50A, and converts the mic level signal received to a networked compliant digital audio signal that is compatible with at least one type of audio network protocol. The audio adapter 100A is configured to support and accommodate any type of audio network protocol.

The audio adapter 100A comprises a receptacle connector 150A (FIG. 4) that is mateable with a standard network cable 210 (e.g., a CAT5 cable). For example, as shown in FIG. 3, the receptacle connector 150A is mateable with a first jack connector 210A located at a first end of the network cable 210. The network cable 210 transmits networked compliant digital audio signals outputted by the audio adapter 100A to one or more components included on a network. For example, a second jack connector 210B located at a second end of the network cable 210 may be mateable with an input connector of a network switch 200A (FIG. 4) that distributes the networked compliant digital audio signals to at least one audio equipment (e.g., an audio mixer) in an audio delivery chain.

The audio adapter 100A provides a multi-functional platform that enables flexible, efficient, and optimized networked audio performance.

FIG. 4 illustrates an example plug-on networked audio adapter 100A in detail, in accordance with one embodiment. A plug-on networked audio adapter 100A comprises at least one of the following components: (1) a releasably mateable plug connector 110A, (2) an analog audio amplifier 120A, (3) an A/D converter 130A, (4) a network interface unit 140A, and (5) a receptacle connector 150A. The audio adapter 100A further comprises one or more additional components not shown, such as a power unit for supplying power to a professional audio device/system mated with the audio adapter 100A.

The plug connector 110A is directly mateable with a receptacle connector 51A of a professional audio device/system, such as a microphone 50A. In one embodiment, the plug connector 110A may be a XLR connector. In another embodiment, the plug connector 110A comprises another type of connector.

The audio amplifier 120A is configured to: (1) receive, via the plug connector 110A, an analog audio signal from a professional audio device/system that the plug connector 110A is mated with, such as a mic level signal from a microphone 50A, and (2) amplify the analog signal received.

The A/D converter 130A is configured to: (1) receive, from the analog audio amplifier 120A, a resulting amplified analog audio signal, such as a resulting amplified mic level signal, and (2) convert the amplified analog audio signal to a digital audio signal.

The network interface unit 140A is configured to: (1) receive, from the A/D converter 130A, a resulting digital audio signal, and (2) prepare and convert the digital audio signal into a networked compliant digital audio signal that is compatible with at least one type of audio network protocol.

The receptacle connector 150A is directly mateable with a standard network cable 210 that transmits networked compliant digital audio signals outputted by the audio adapter 100A to one or more components on a network. In one embodiment, the receptacle connector 150A comprises an RJ45 connector, and each jack connector 210A, 210B of the standard network cable 210 comprises a RJ45 jack. In another embodiment, the receptacle connector 150A comprises another type of connector, and each jack connector 210A, 210B of the standard network cable 210 comprises another type of jack connector.

For expository purposes, the term "networked media device" as used herein refers to a media device 50 mated with a networked media adapter 100, enabling the media device 50 to operate directly with one or more media equipment 220 on a network (e.g., on a delivery chain) via any type of network protocol.

A networked media adapter 100 enables a networked media device 50 to operate directly with at least one media equipment 220 on a network by supplying a networked compliant digital signal to the at least one media equipment. The adapter 100 allows generation of a networked compliant digital signal that is as close as possible to an original source (i.e., the networked media device 50) in a delivery chain. The adapter 100 allows for networked compliant digital signals to be provided from a first point in the delivery chain without the need for breakout boxes. Compared to existing solutions, the adapter 100 is more cost-effective as it removes the need for breakout boxes and analog cables (e.g., analog microphone cables). Further, unlike existing solutions, the adapter 100 provides improved performance, as analog cables may be subject to unwanted EMI and may limit signal performance.

Further, the adapter 100 allows direct individual control of one or more performance characteristics (e.g., pick up pattern or high pass filtering) of the networked media device 50 by any media equipment on the network.

Figure 5:
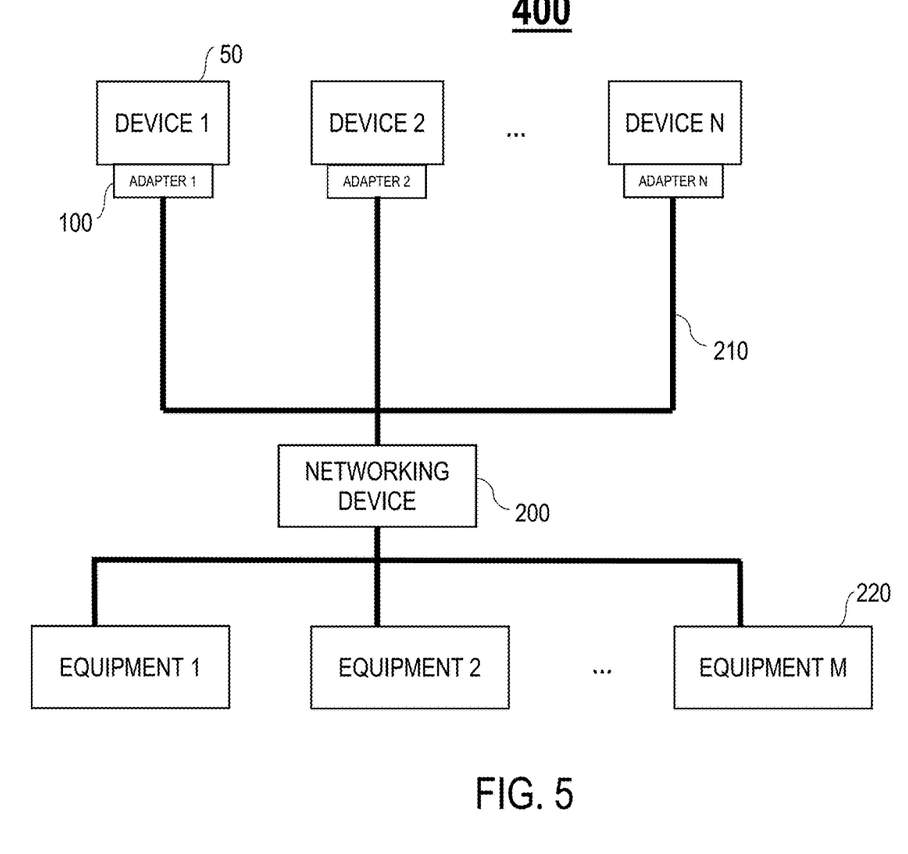
FIG. 5 illustrates an example network comprising multiple networked media devices, in accordance with one embodiment.

FIG. 5 illustrates an example network 400 comprising multiple networked media devices 50, in accordance with one embodiment. As shown in FIG. 5, each individual networked media device 50 is mated with its own corresponding networked media adapter 100. Each networked media device 50 on the network 400 may be monitored/seen and individually controlled in a networked configuration. For example, any media equipment 220 on the network 400 may access and individually control any networked media device 50 on the network 400.

In one embodiment, the network 400 allows bi-directional propagation of signals between at least one media equipment 220 on the network 400 and at least one networked media device 50. For example, a many-to-one correspondence may be implemented where multiple media equipment 220 on the network 400 send control signals to one networked media device 50 on the network 400, and the multiple media equipment 220 receive a networked compliant digital signal outputted by a networked media adapter 100 mated with the networked media device 50. As another example, a one-to-many correspondence may be implemented where multiple networked media devices 50 on the network 400 receive control signals from one media equipment 220 on the network 400, and each networked media adapter 100 mated with each of the networked media devices 50 sends a corresponding networked compliant digital signal to the media equipment 220. The examples provided above illustrate a level of granulation and control that was not previously possible/available using existing solutions.

In one embodiment, a networked media adapter 100 mated with a networked media device 50 allows for control of the networked media device 50 to originate as far away as an end user, if so configured. For example, if the networked media device 50 comprises a microphone 50A (FIG. 3), an end user (e.g., a viewer) watching a specific broadcast may reach a microphone end-point via a "METADATA" interface to allow a better user/viewer experience.

In one embodiment, a networked media device 50 may have multiple media channels (e.g., multiple audio channels). A networked media adapter 100 mated with a networked media device 50 having multiple media channels is configured to receive each of the multiple media channels.

For example, assume a networked media device 50 comprises a microphone 50A (FIG. 3). The microphone 50A comprises multiple audio channels that include, but are not limited to, the following: (1) a first audio channel for picking up sounds directly on-axis to a front of the microphone 50A, (i.e., a "middle channel" for a main "MID" signal), and (2) a second channel for picking up sounds "around" the microphone 50A (i.e., a "mixed side channel" for ambient sound). Assume the microphone 50A is positioned in the middle between a first side microphone and a second side microphone, where the first side microphone is positioned about 90 degrees clockwise from the middle channel of the microphone 50A, and the second side microphone is positioned about 90 degrees counter-clockwise from the middle channel of the microphone 50A. The mixed side channel of the microphone 50A picks up signals from both the first side microphone and the second side microphone.

A networked media adapter 100 mated with a networked media device 50 having multiple media channels is configured to bi-directionally pass one or more of the media channels, enabling one or more end users to "mix" or use one or more of the media channels in accordance with their preferences.

For example, assume a microphone 50A having multiple audio channels is on a network that includes the following audio equipment: (1) a first set of audio equipment associated with a first operator (e.g., a television network, such as NBC), and (2) a second set of audio equipment associated with a second operator (e.g., another television network, such as CBS). Both operators are able to monitor networked compliant digital audio signals outputted by an audio adapter 100A mated to the microphone 50A. All audio channels of the microphone 50A are individually accessible on the network via the audio adapter 100A. For example, the audio adapter 100A may provide a customized audio feed for the first operator comprising a strong "MID" signal from the middle channel of the microphone 50A with some ambient sound from the mixed side channel of the microphone 50A. The audio adapter 100A may provide a different customized audio feed for the second operator comprising more ambient sound from the mixed "side" channel of the microphone 50A instead of a "MID" signal from the middle channel of the microphone 50A (e.g., more ambient sounds associated with reaction of spectators watching a golf tournament rather than the sound of a golf ball being hit/going into a hole). The examples provided above illustrate a level of individual control and accessibility that was not previously possible/available using existing solutions.

Figure 6:
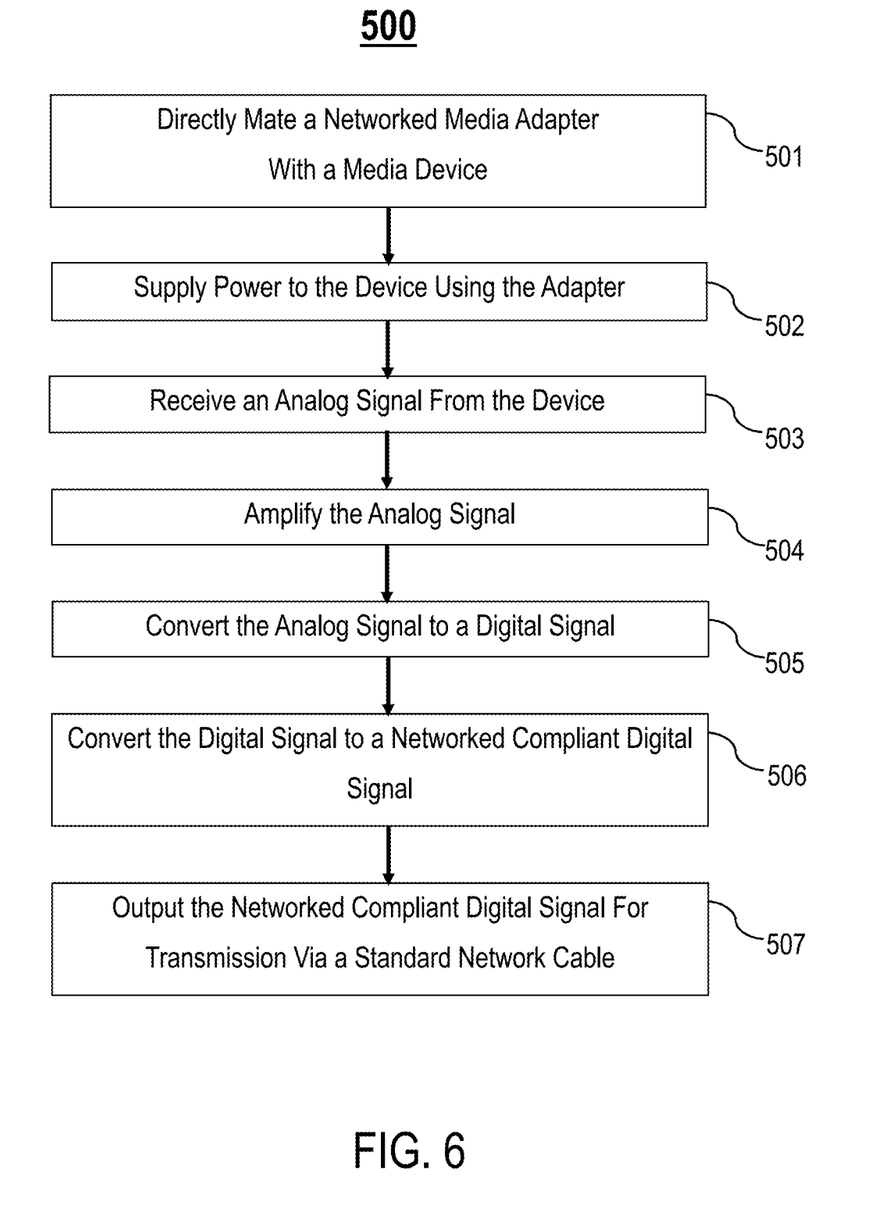
FIG. 6 illustrates a flowchart of an example process for providing a networked compliant digital signal, in accordance with one embodiment.

FIG. 6 illustrates a flowchart of an example process 500 for providing a networked compliant digital signal, in accordance with one embodiment. In process block 501, directly mate a networked media adapted with a media device. In process block 502, supply power to the device using the adapter. In process block 503, receive an analog signal from the device. In process block 504, amplify the analog signal. In process block 505, convert the analog signal to a digital signal. In process block 506, convert the digital signal to a networked compliant digital signal. In process block 507, output the networked compliant digital signal for transmission via a standard network cable.

In one embodiment, process blocks 501-507 may be performed utilizing a networked media adapter 100.

Figure 7:
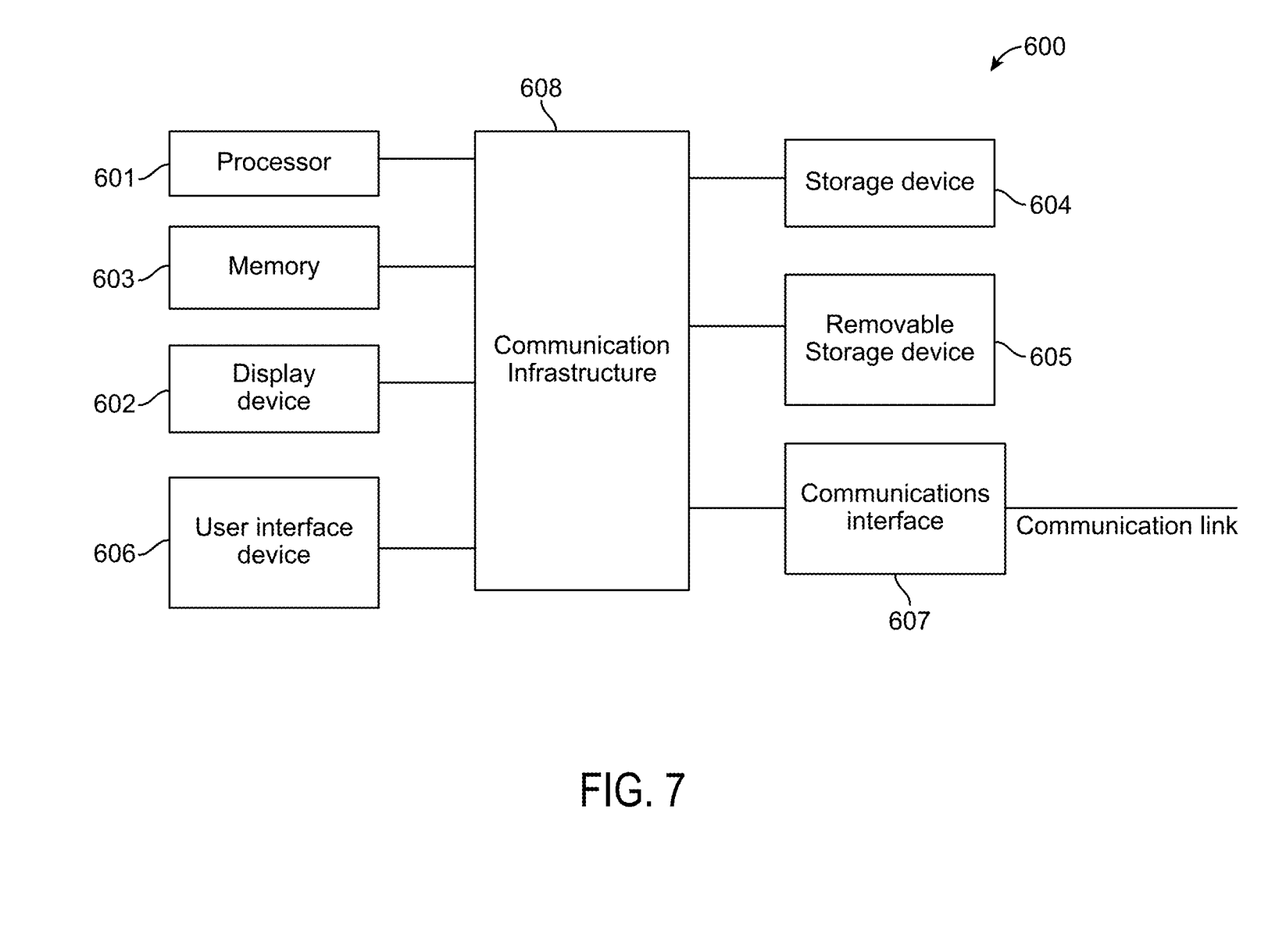
FIG. 7 is a high-level block diagram showing an information processing system comprising a computer system useful for implementing the disclosed embodiments.

FIG. 7 is a high-level block diagram showing an information processing system comprising a computer system 600 useful for implementing the disclosed embodiments. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The main memory 603 may store instructions that when executed by the one or more processors 601 cause the one or more processors 601 to perform one or more process blocks of the process 500.

The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for one or more process blocks of process 500 (FIG. 6) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. An apparatus comprising:
   an input connector configured to receive a signal from a media device, wherein the apparatus is a compact, releasable, plug-on adapter that is directly mateable with the media device via the input connector to receive the signal without a cable;
   a network interface configured to convert the signal to a networked compliant digital signal compatible with a network protocol; and
   an output connector configured to output the networked compliant digital signal for transmission via a standard network cable.

2. The apparatus of claim 1, wherein the output connector is directly mateable with the standard network cable.

3. The apparatus of claim 1, wherein the signal is based on an analog signal received from the media device connected to the apparatus via the input connector.

4. The apparatus of claim 3, further comprising:
   an analog-to-digital (A/D) converter configured to convert the analog signal to the signal.

5. The apparatus of claim 3, further comprising:
   a power unit configured to supply power to the media device to power on the media device.

6. The apparatus of claim 3, wherein the media device is on a network, the media device has a plurality of media channels, and the apparatus is configured to receive a signal on each media channel of the plurality of media channels, such that each media channel of the plurality of media channels is individually accessible on the network via the apparatus.

7. The apparatus of claim 6, wherein the apparatus is configured to bi-directionally pass one or more media channels of the plurality of media channels to provide a customized feed based on the one or more media channels to an end user.

8. The apparatus of claim 1, wherein the network protocol comprises an audio network protocol, and the networked compliant digital signal comprises a digital audio signal compliant with the audio network protocol.

9. The apparatus of claim 1, wherein the standard network cable comprises a Category 5 cable.

10. A method comprising:
    receiving, via an adapter, a signal from a media device, wherein the adapter is a compact, releasable, plug-on adapter that is directly mateable with the media device via an input connector of the adapter to receive the signal without a cable;
    converting, via the adapter, the signal to a networked compliant digital signal compatible with a network protocol; and
    outputting, via the adapter, the networked compliant digital signal for transmission via a standard network cable.

11. The method of claim 10, wherein the adapter is directly mateable with the standard network cable.

12. The method of claim 10, wherein the signal is based on an analog signal received from the media device connected to the adapter via the input connector.

13. The method of claim 12, further comprising:
    converting, via the adapter, the analog signal to the signal.

14. The method of claim 12, further comprising:
    supplying, via the adapter, power to the media device to power on the media device.

15. The method of claim 10, wherein the network protocol comprises an audio network protocol, and the networked compliant signal comprises a digital audio signal compliant with the audio network protocol.

16. The method of claim 10, wherein the standard network cable comprises a Category 5 cable.

17. A network comprising:
    a media device;

an adapter connected to the media device, wherein the adapter is a compact, releasable, plug-on adapter that is directly mateable with the media device via an input connector of the adapter to receive an analog signal from the media device without a cable, the adapter is configured to convert the analog signal from the media device to a networked compliant digital signal compatible with a network protocol, and the adapter is further configured to output the networked compliant digital signal for transmission via a standard network cable; and a media equipment connected to the standard network cable.

18. The network of claim 17, wherein the adapter is further directly mateable with the standard network cable.

* * * * *